W. L. CHRYSLER.
RESILIENT WHEEL.
APPLICATION FILED JUNE 8, 1911.
1,064,129.
Patented June 10, 1913.
2 SHEETS—SHEET 1.
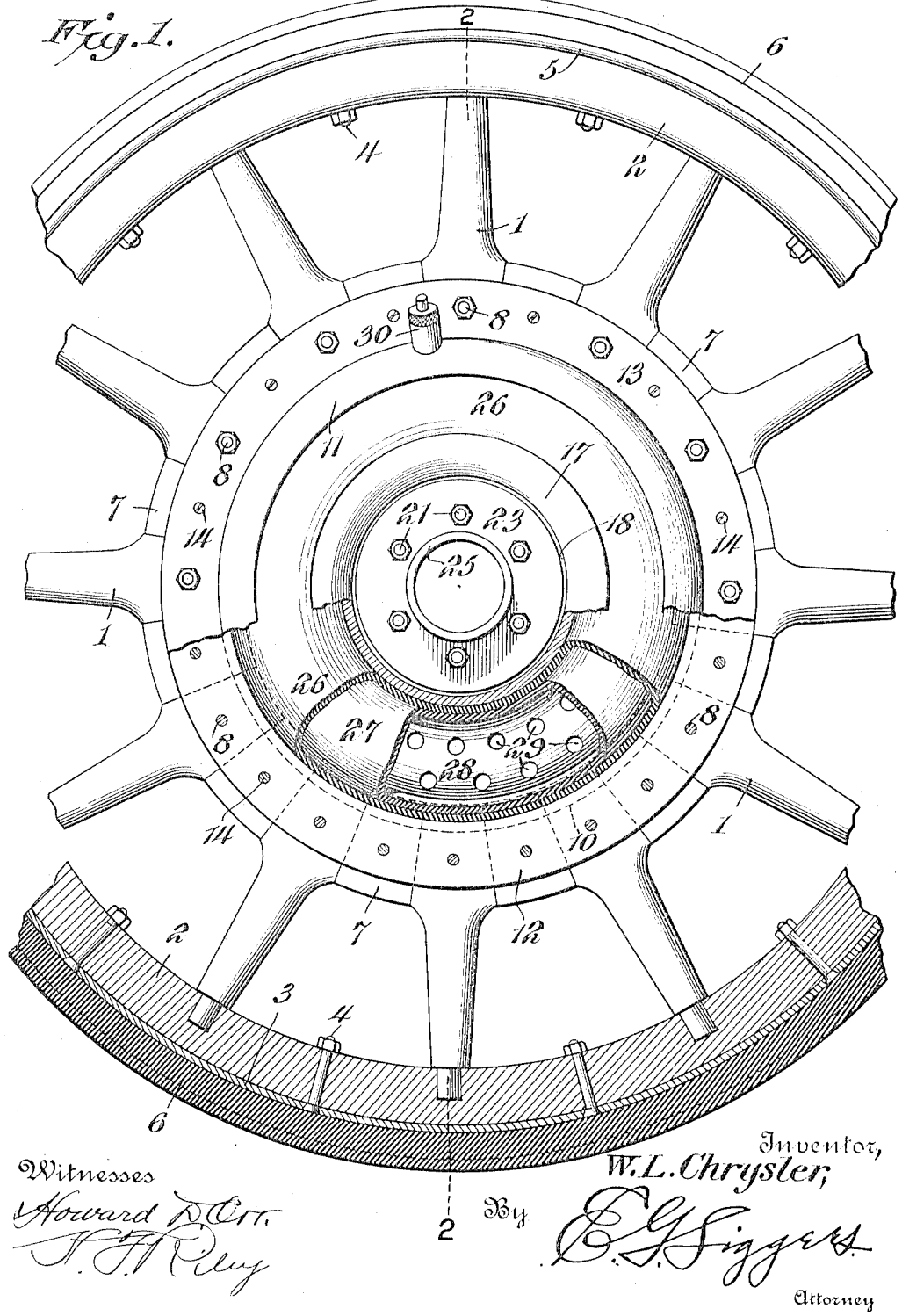
Witnesses
Howard D. Orr
F. T. Riley
Inventor,
W. L. Chrysler,
By E. G. Siggers
Attorney

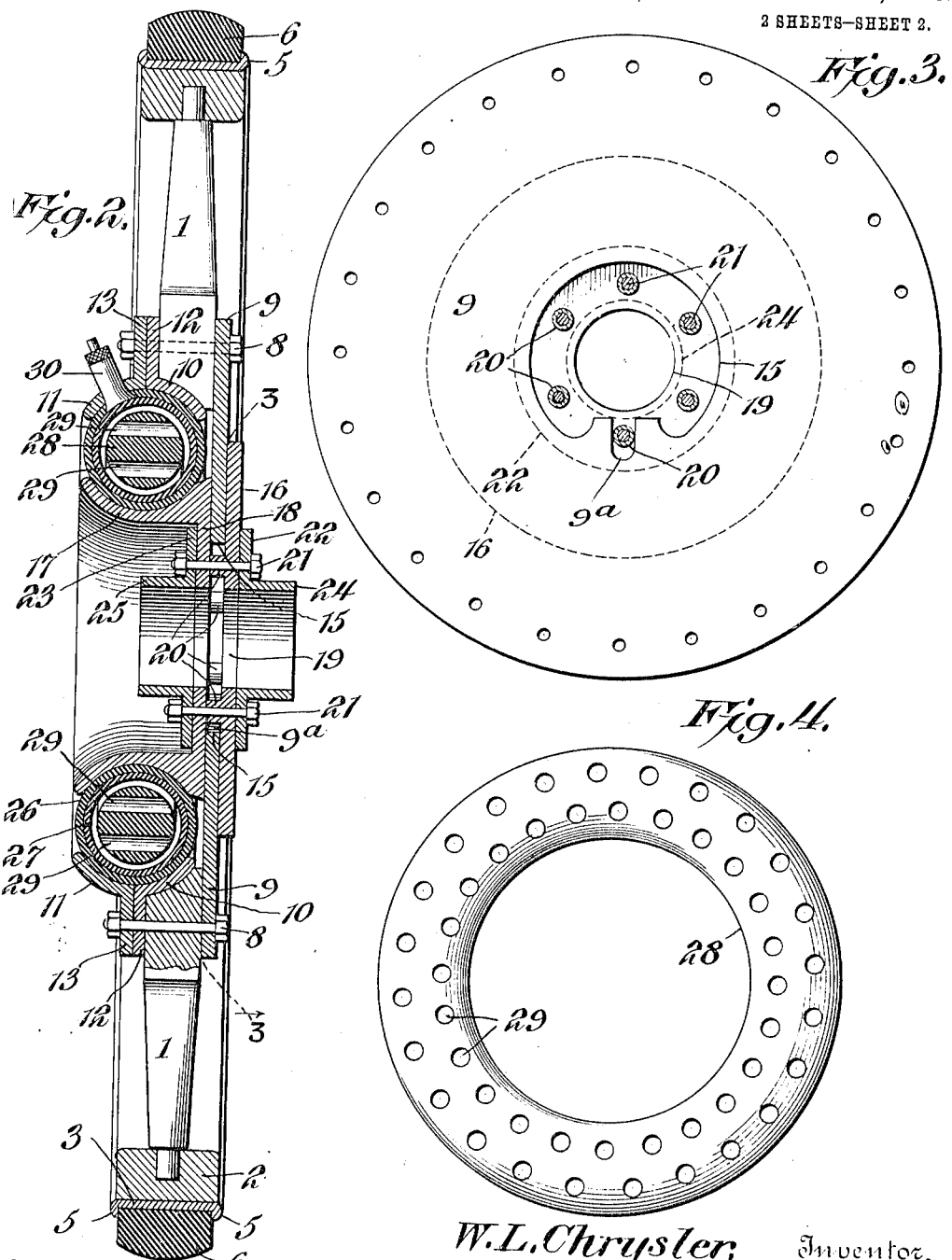

UNITED STATES PATENT OFFICE.

WILLIAM L. CHRYSLER, OF EUGENE, OREGON, ASSIGNOR, BY DIRECT AND MESNE ASSIGNMENTS, TO PORTLAND AUTOMOBILE WHEEL COMPANY, OF PORTLAND, OREGON, A CORPORATION OF OREGON.

RESILIENT WHEEL.

1,064,129.  Specification of Letters Patent. Patented June 10, 1913.

Application filed June 8, 1911. Serial No. 632,034.

*To all whom it may concern:*

Be it known that I, WILLIAM L. CHRYSLER, a citizen of the United States, residing at Eugene, in the county of Lane and State of Oregon, have invented a new and useful Resilient Wheel, of which the following is a specification.

The invention relates to improvements in wheels.
The object of the present invention is to improve the construction of wheels, and to provide a simple, strong and durable wheel of inexpensive construction, equipped with a solid rubber tire, and provided with pneumatic cushioning means surrounding the hub at the center of the wheel and adapted to afford the elasticity and cushioning action of an ordinary pneumatic tire.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation, partly in section, of a wheel, constructed in accordance with this invention. Fig. 2 is a central vertical sectional view of same on the line 2—2 of Fig. 1. Fig. 3 is a sectional view on the line 3—3 of Fig. 2. Fig. 4 is a detail view of the rubber cushioning ring.

Like numerals of reference designate corresponding parts in all the figures of the drawings.

In the accompanying drawings in which is illustrated the preferred embodiment of the invention, the wheel, which is designed for use on motor and other vehicles, comprises in its construction spokes 1, connected at their outer ends to a wooden felly 2 on which is arranged a metallic rim 3. The spokes and the felly may be of any desired construction, and the metallic rim, which is secured to the wooden felly by bolts 4, or other suitable means, is provided at its side edges with narrow flanges 5, forming a channel for the reception of a solid rubber tire 6.
In the embodiment illustrated, the spokes have their inner ends spaced apart by blocks 7, and secured by transverse bolts 8, or other fastening devices between a vertically disposed plate 9 and an inner member 10 of an outer channeled ring, which is composed of the said inner member 10 and a similar outer member 11. The members 10 and 11 of the outer channeled ring are provided with vertical flanges 12 and 13, which are fitted together, as clearly shown in Fig. 2 of the drawings. The inner flange 12 also fits against the outer faces of the inner ends of the spokes 1. The sectional outer channeled ring is arcuate in cross section and surrounds an annular pneumatic cushion, which is off-set laterally from the median plane of the wheel. The spacing blocks 7, which are interposed between the inner ends of the spokes, are tapered and are secured to the flanges 12 and 13 and to the vertical plate 9 by bolts 14, or other suitable fastening devices, and the inner ends of the spokes are cut-away at one side and tapered to fit the inner member of the outer channeled ring.

The plate 9, which is in the form of a disk, is provided with a central opening 15, and it is slidably arranged between an inner vertical hub supporting plate 16 and an inner channeled supporting ring 17, which receives the pneumatic cushion. The inner channeled supporting ring 17 is transversely curved or arcuate in cross section to fit and form a seat for the pneumatic cushion, and it is provided at its inner side with a vertical inwardly extending annular flange 18. The vertical plate 16, which is provided with a central opening 19, has an annular series of bosses 20, surrounding the same and spacing the supporting ring from the plate 16 to provide a guide or way for the vertical plate 9. The vertical plate 9 is provided at its inner edge with a radial slot 9ª, receiving one of the bosses 20, whereby the inner and outer portions of the wheel are interlocked and caused to rotate in unison. The flange 18 and the plate 16 are connected by an annular series of transverse bolts 21, which also pass through annular attaching flanges 22 and 23 of inner and outer hub sections or bands 24 and 25. The hub sections or bands 24 and 25, which extend in opposite directions, are adapted to receive any standard hub or axle box, whereby the wheel may be applied to any type of automobile, motor vehicle, or the like. The attaching flanges 22 and 23 extend outwardly from the inner ends of the bands or sections 24 and 25, and they reinforce the inner vertical plate 16 and the flange of the inner supporting ring and provide a strong and durable construction.

The pneumatic cushion comprises an outer covering 26, an inner inflatable tube 27, and a rubber cushioning ring 28, located within the inflatable inner tube and provided with an annular series of transverse openings or passages 29, arranged at regular intervals, the passages of one series being located opposite the spaces or intervals between the openings or passages of the other series. Any preferred number of rows of openings may, of course, be employed, and the inner cushioning ring, which may be constructed of solid rubber, will be rendered highly resilient by the transverse openings, which also form air chambers or spaces to enable a sufficient volume of air to be contained within the inner inflatable tube to afford all the advantages of a pneumatic cushion. Also the air chambers of the inner cushioning ring will prevent the air contained within the inflatable inner tube from heating and forming gases, and explosions and blow-outs will be thus avoided. This action of the inner cushioning ring may be increased by constructing the inner cushioning ring of soft spongy rubber to form numerous air cells. The inner rubber ring is also adapted in event of a puncture of a pneumatic cushion to form a highly resilient cushion for carrying the load. The central and outer portions of the wheel have relative slidable movement which is cushioned by the pneumatic cushion, which affords the resiliency of a pneumatic tire, and which is practically immune from punctures. The inflatable tire is provided with a valve 30, constructed in the usual manner and extending outwardly through an opening in the outer member 11 of the outer channeled ring.

Having thus fully described my invention, what I claim as new and desire to secure by Letters Patent, is:—

1. A wheel of the class described comprising an outer portion including spokes, a felly, and a tire, a vertical plate secured to the outer portion of the wheel at one side of the spokes, an outer channeled ring composed of sections divided in the median plane of the ring and having abutting radially extending flanges, said ring being mounted on the outer portion of the wheel at the opposite side of the spokes, an inner portion having a hub and provided with spaced members forming a guide slidably receiving the vertical plate of the outer portion of the wheel, an inner channeled ring mounted on the inner portion of the wheel, and an annular cushion interposed between the inner and outer channeled rings.

2. A wheel of the class described comprising an outer portion having spokes, a hub, an annular cushion, an inner channeled ring concaved to fit the cushion and forming an inner support for the same and having its inner side enlarged and extended and constituting one wall of a guide, a separate plate spaced from the said inner side of the channeled ring and forming the other wall of the guide, means for securing the ring and the plate to the hub, a flat plate secured to the spokes and working in the guide, and an outer channeled ring secured to the other side of the spokes and concaved to fit the outer side of the cushion, said outer ring being divided longitudinally into two parts, one part fitting between the inner ends of the spokes and the cushion and the other part fitting against the cushion and the outer side thereof.

3. A wheel of the class described comprising an outer portion including spokes, a felly, and a tire, an inner portion composed of inner and outer hub sections provided with outstanding attaching flanges, an inner vertical plate secured between the attaching flanges of the hub sections, an inner ring having a flange also secured between the said attaching flanges and spaced from the inner vertical plate to form a guide, an outer vertical plate secured to the outer portion of the wheel at one side of the spokes and slidable in the said guide, an outer ring secured to the outer portion of the wheel at the opposite side of the spokes, and a cushion interposed between the inner and outer rings.

4. A wheel of the class described comprising an outer portion including spokes, a felly, and a tire, an inner portion having a hub, an outer vertical plate secured to the spokes at one side thereof, an outer sectional ring divided upon a medial plane, the sections being provided with abutting flanges, which are connected with the spokes at the opposite side from the plate, an inner vertical plate mounted on the inner portion of the wheel, an inner supporting ring secured to the inner portion of the wheel and spaced from the inner vertical plate to form a guide for the outer vertical plate, and a cushion interposed between the inner and outer rings.

In testimony, that I claim the foregoing as my own, I have hereto affixed my signature in the presence of two witnesses.

WILLIAM L. CHRYSLER.

Witnesses:
ABRAHAM L. YARNALL,
C. A. WINTERMEIER.